United States Patent [19]
Tumminelli et al.

[11] Patent Number: 5,196,041
[45] Date of Patent: Mar. 23, 1993

[54] METHOD OF FORMING AN OPTICAL CHANNEL WAVEGUIDE BY GETTERING

[75] Inventors: Richard P. Tumminelli, Ashland; Farhad Hakimi, Watertown; John R. Haavisto, Marshfield Hills, all of Mass.

[73] Assignee: The Charles Stark Draper Laboratory, Inc., Cambridge, Mass.

[21] Appl. No.: 830,618

[22] Filed: Feb. 4, 1992

Related U.S. Application Data

[63] Continuation-in-part of Ser. No. 761,416, Sep. 17, 1991.

[51] Int. Cl.⁵ ............................................. C03C 15/00
[52] U.S. Cl. .................... 65/30.1; 65/3.11; 65/31; 65/111; 219/121.8; 219/121.29; 385/129; 385/130; 427/36; 427/53.1; 427/162; 427/376.2
[58] Field of Search ............. 65/31, 3.11, 30.1, 60.53, 65/3.14, 60.2, 117, 102; 156/663; 219/121.29, 121.8; 427/35, 36, 162, 167, 53.1, 372.2, 375, 376.2, 397.7; 385/129, 130

[56] References Cited

U.S. PATENT DOCUMENTS

| | | | |
|---|---|---|---|
| 4,676,820 | 6/1987 | LeSergent et al. | 65/3.12 |
| 4,756,734 | 7/1988 | Kersten et al. | 65/30.1 |
| 4,765,819 | 8/1988 | Kersten et al. | 65/30.1 |
| 4,886,538 | 12/1989 | Mahapatra | 65/111 |

FOREIGN PATENT DOCUMENTS 61-158303  7/1986  Japan .

*Primary Examiner*—Robert L. Lindsay
*Attorney, Agent, or Firm*—Iandiorio & Dingman

[57] ABSTRACT

A method of forming an optical channel waveguide by gettering includes forming on a substrate a porous waveguide layer containing an index of refraction raising dopant in a compound; sealing a portion of the waveguide layer along a path; and reacting the component, including the index of refraction raising dopant, with a reactant in the unsealed portion of the waveguide layer to form a volatile product from the reactant and dopant to deplete the dopant in the unsealed portion of the waveguide layer and reduce its index of refraction relative to that in the path to produce a channel waveguide along the path.

14 Claims, 3 Drawing Sheets

METHOD OF FORMING AN OPTICAL CHANNEL WAVEGUIDE BY GETTERING

RELATED CASE

This application is a Continuation-in-Part of U.S. Ser. No. 07/761,416, filed Sep. 17, 1991, entitled "Method of Forming an Optical Waveguide by Selective Volatization" by Tumminelli et al.

FIELD OF INVENTION

This invention relates to a method of forming an optical waveguide, and more particularly to such a method which selectively getters a dopant to lower the index of refraction about a path and create a waveguide.

BACKGROUND OF INVENTION

Planar waveguides in glass have been of interest for some time for making low-cost, high-performance passive optical components such as ring resonators, couplers, splitters and wavelength division multiplexers. Currently, two processes are widely used for making planar waveguides in glass. The first method is ion exchange that uses a glass substrate containing mobile ions which can be locally exchanged for another ion which will increase the refractive index. For example, a glass containing sodium ions could be masked to define a waveguide path, then immersed in a molten potassium salt bath where the sodium would be exchanged for the potassium, which would result in a higher index of refraction in the path and create a waveguide. This ion exchange technique has certain shortcomings. The waveguide is formed on the surface of the glass and losses are associated with the top surface roughness and with ionic defects occurring during the exchange. Recent advances in this technology have led to propagation losses of 0.01 dB/cm, but this requires careful fabrication techniques including judicious choice of materials and glass substrate composition and precise process control. Another technique is to grow glass on a silicon substrate by flame hydrolysis deposition (FHD) and form waveguides by reactive ion etching. Losses of 0.01 dB/cm have been achieved. This process is the same as that which is used to make fiber optic preforms from which telecommunications grade fiber can be drawn. The fiber has a loss of 1 dB/Km or $10^{-5}$ dB/cm, three orders of magnitude lower than losses achieved in planar form. The material, therefore, cannot be the cause of the losses in planar form. Waveguides formed by this process employ masking and subsequent etching to remove portions of the substrate and leave the raised, ribbed waveguide. A number of different etching techniques can be used. Etching techniques, however, leave the ribbed waveguide with rough edges that contribute to higher losses. Further processing is required to attempt to reduce the roughness and produce smoother boundaries.

SUMMARY OF INVENTION

It is therefore an object of this invention to provide an improved method of forming an optical waveguide.

It is a further object of this invention to provide such an improved method for more easily and inexpensively fabricating a lower loss waveguide.

It is a further object of this invention to provide such an improved method for fabricating a waveguide without etching.

It is a further object of this invention to provide such an improved method which results in a waveguide having a more uniform index of refraction profile along its length.

The invention results from the realization that a lower loss, optical channel waveguide can be made by forming on a substrate a porous waveguide layer which includes an index of refraction raising dopant in a compound, sealing a portion of the waveguide layer along a path and reacting the compound including the index of refraction raising dopant with a reactant in the unsealed portion of the waveguide layer to form a volatile product from the reactant and dopant to deplete the dopant in the unsealed portion and reduce its index of refraction relative to that in the path to create a channel waveguide along the path.

This invention features a method of forming an optical channel waveguide by gettering. A porous waveguide layer containing an index of refraction raising dopant in a compound is deposited on a substrate. A portion of the waveguide layer along a path is sealed. The compound including the index of refraction raising dopant is reacted with a reactant in the unsealed portion of the waveguide layer to form a volatile product from the reactant and dopant to deplete the dopant in the unsealed portion of the waveguide layer and reduce its index of refraction relative to that in the path to thereby produce a channel waveguide along the path.

In a preferred embodiment, the porous waveguide layer may be formed of unsintered soot. The unsintered soot may be a flame hydrolysis deposition unsintered soot. The waveguide layer may be silica and the sealing step may include at least partially sintering the waveguide layer along the path. The step of sealing may alternatively include applying a non-porous coating along the path. The non-porous coating may be platinum. The dopant may be antimony, the dopant compound may be antimony chloride, and the reactant may be chlorine. The step of at least partially sintering the path may include irradiating the path with a particle beam or a photon beam such as a laser beam. After the gettering has been accomplished by the reaction of the reactant and dopant compound, there may be a consolidation of the porous portions of the waveguide layer.

DISCLOSURE OF PREFERRED EMBODIMENT

Other objects, features and advantages will occur to those skilled in the art from the following description of a preferred embodiment and the accompanying drawings, in which.

Figure 4:
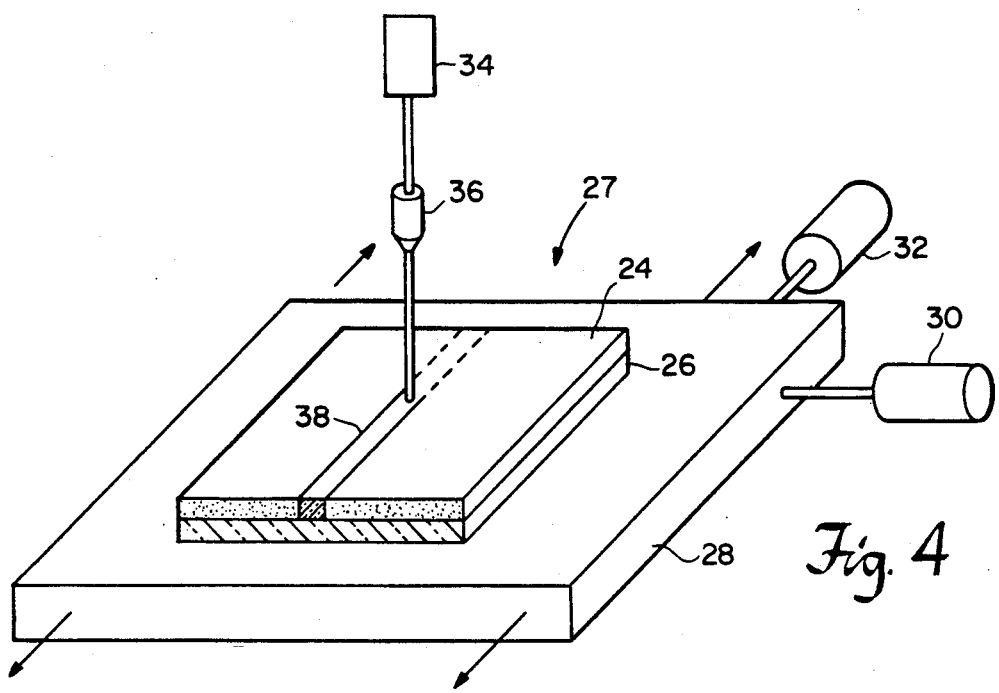
FIG. 4 is a schematic diagram of a laser and an X,Y table for sealing a predetermined path on the porous, doped silica layer.
Figure 7:
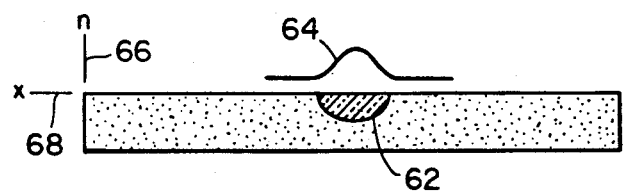
Figure 8:
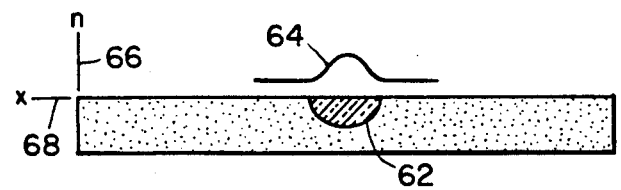
Figure 9:
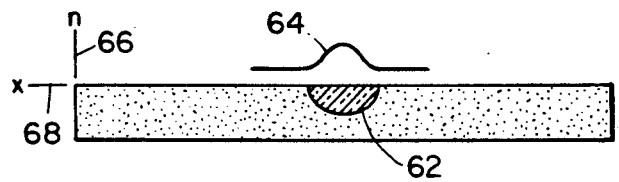
Figure 10:
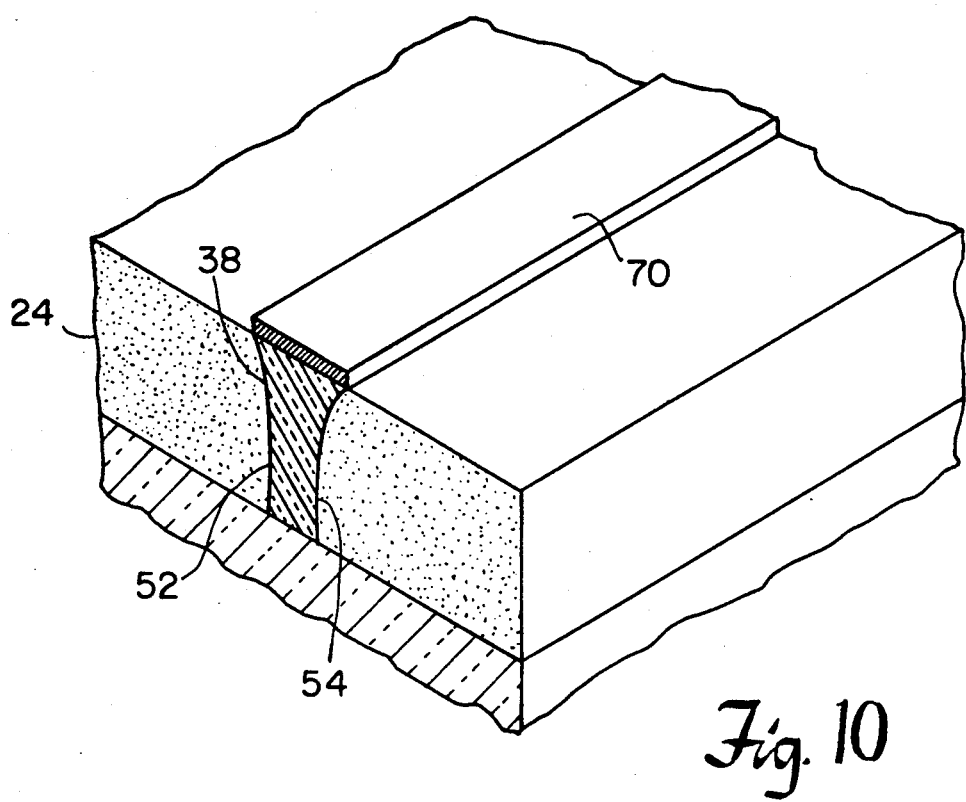

FIGS. 7, 8 and 9 illustrate the cross-sectional index of refraction profile at three arbitrary points at sectional lines 7—7, 8—8 and 9—9, respectively; and FIG. 10 is a three-dimensional view of a substrate bearing a porous, doped silica layer such as shown in FIG. 4, where the path on the silica layer is sealed with a platinum coating.

This invention may be accomplished by forming on a substrate a porous waveguide layer containing an index of refraction raising dopant in a compound. The substrate may be formed of silica or silicon. The porous waveguide layer may be formed of silica using an unsintered soot such as obtained by flame hydrolysis deposition. The dopant could be a material such as germanium, aluminum, titanium, zirconium, phosphorous or antimony, present in the form of a compound, for example antimony chloride. A portion of the waveguide layer is sealed along a path. That sealing may be done by heating the waveguide layer along the path using a laser beam or other heating means to partially or totally sinter the unsintered waveguide layer by consolidating the sintered soot. The sealing could also be accomplished by applying a non-porous coating along the path, such as platinum or some similar material. The porous waveguide with its sealed portion is then submitted to a reactant which will react with the compound accessible in the unsintered, unsealed portion of the waveguide layer. The reactant and the dopant compound combine to form a volatile product which depletes the dopant in the unsealed portion of the waveguide layer and reduces its concentration and thus the index of refraction in the unsealed portion relative to the sealed portion in the path, thereby producing a channel waveguide along the path. With a dopant such as antimony, the compound may be antimony pentoxide and the reactant may be chlorine. After the gettering by the chlorine has been accomplished, a final sintering step consolidating the remaining porous portions of the waveguide layer is effected. The reaction between the antimony pentoxide and the chlorine may be effected at an elevated temperature, for example 1100° C. Originally the antimony doped waveguide layer may have an index of refraction of 1.460. After the gettering action by the chlorine, the sealed portion along the path will maintain that index of refraction but the unsealed portion may have an index of refraction as low as 1.458, providing a differential in index of refraction Δn of as much as 0.14%, sufficient to produce a practical waveguide in the path.

Figure 1:
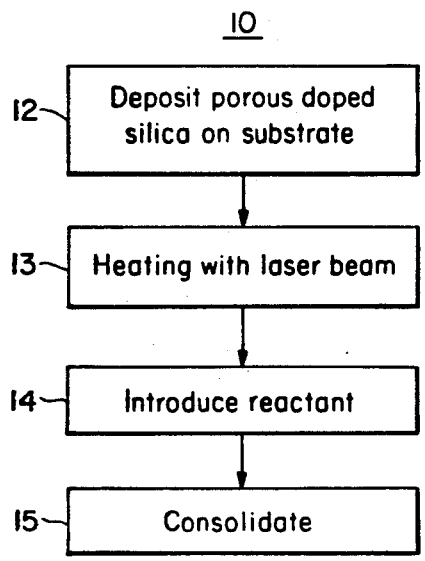
FIG. 1 is a simplified block diagram of the method according to this invention.

A simplified diagram of the method 10, FIG. 1, of forming an optical waveguide by gettering includes first depositing a porous doped silica on a substrate, step 12, then heating a path along the waveguide with a laser beam in step 13. The reactant is introduced in step 14 to getter the dopant in the unsealed portion, after which the unsealed portion is consolidated in step 15. If the path portion of the waveguide was sealed by partial sintering or partial consolidation, the complete sintering or consolidation will occur in step 15.

Figure 3:
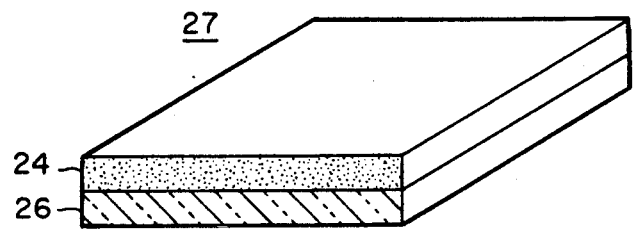
FIG. 3 is a three-dimensional view of a substrate bearing a porous, doped silica layer made by the method depicted in FIG. 1 according to this invention.
Figure 2:
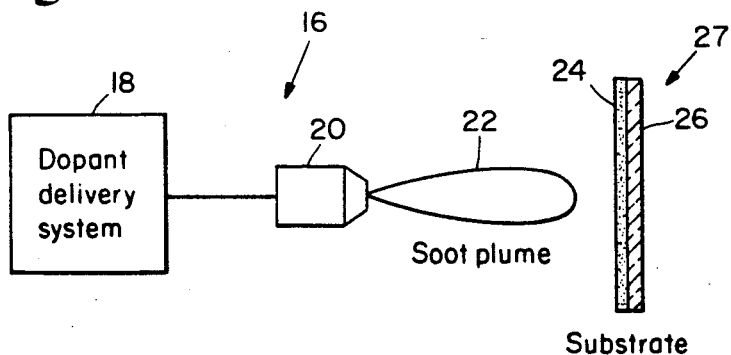
FIG. 2 is a schematic diagram of a flame hydrolysis deposition apparatus for depositing a porous, doped silica layer on a substrate according to this invention.

A conventional flame hydrolysis deposition system 16, FIG. 2, employs a dopant delivery system 18 and a torch 20 which produces a soot plume 20 that deposits a layer 24 of porous doped silica on substrate 26, which is doped with antimony in the dopant compound antimony pentoxide, $Sb_2O_5$. Waveguide 27, comprising substrate 26 and porous sintered doped waveguide layer 24, is shown in FIG. 3.

Substrate 26 is mounted on X,Y table 28, FIG. 4, driven by X drive motor 30 and Y drive motor 32 to enable a laser such as $CO_2$ laser 34 to irradiate through object lens system 36 a narrow path 38 along layer 24 to locally heat and consolidate or sinter, or at least partially sinter, the porous waveguide along path 38.

Figure 5:
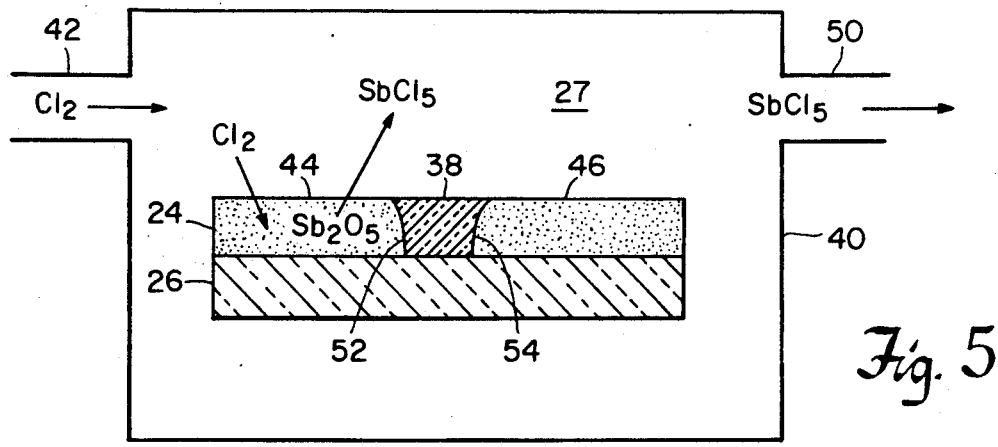
FIG. 5 is a side elevational schematic view of the doped, porous waveguide layer of FIGS. 3 and 4 illustrating the gettering action.

Following this, waveguide 27, FIG. 5, is placed in a chamber 40 heated to approximately 1100° C. Chlorine gas delivered through inlet 42 penetrates the porous waveguide layer 24 in the unsealed areas 44 and 46, but not in the sealed area along path 38. The gettering action by the chlorine gas takes place as the chlorine enters the unsealed portions 44 and 46 and reacts with antimony pentoxide, $Sb_2O5$, forming the volatile product antimony pentachloride, $SbCl_5$, which is drawn off through outlet 50. The sintered or partially sintered path 38 is slightly undercut by the action of laser 34, as can be seen by the tapered sides 52 and 54 of path 38.

Figure 6:
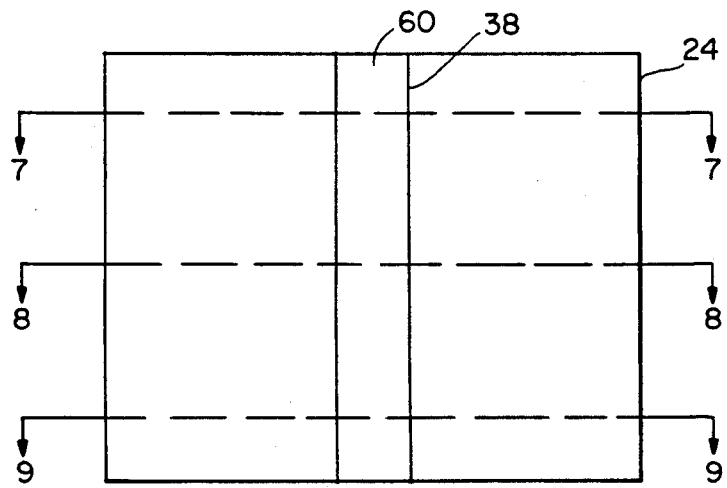
FIG. 6 is a top plan view of a completed waveguide such as shown in FIG. 5 after completion of the gettering.

The smooth boundary condition of the waveguide fabricated according to the technique of this invention is graphically depicted in FIG. 6, where waveguide layer 24, shown in to plan view, depicts path or waveguide 38 which is smooth on its top 60 and also on its other boundary 62, as shown in FIGS. 7, 8 and 9, for the full extent of its length along layer 24. The uniformity of the index of refraction variation along its length is shown by the cross-sectional views of FIGS. 7, 8 and 9, where the smooth transition of index of refraction n over the distance X in each case, is depicted by the ordinates 66 and 68 in each figure.

Although thus far the sealing of the path to form the waveguide channel has been effected by selective heating such as using a laser beam, this is not a necessary limitation of the invention. For example, as shown in FIG. 10, the porous doped waveguide layer 24 may be provided with a sealing layer such as platinum coating 70 which is disposed over path 38 to provide a sealed portion to prevent access of the reactant chlorine to the dopant compound, antimony pentoxide, as occurred with respect to the description in FIGS. 3-5.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A method of forming an optical channel waveguide by gettering, comprising:
   preparing a compound including an index of refraction raising dopant;
   forming on a substrate a porous waveguide layer including said compound;
   sealing a portion of the waveguide layer along a path; and
   reacting the compound including the index of refraction raising dopant with a reactant in the unsealed portion of said waveguide layer to form a volatile product from the reactant and dopant to deplete the dopant in the unsealed portion of the waveguide layer and reduce its index of refraction relative to that in the path to produce a channel waveguide along the path.

2. The method of claim 1 in which said porous waveguide layer is formed of unsintered soot.

3. The method of claim 2 in which said unsintered soot is a flame hydrolysis deposition unsintered soot.

4. The method of claim 1 in which said waveguide layer is silica.

5. The method of claim 1 in which the step of sealing includes at least partially sintering said waveguide layer along said path.

6. The method of claim 1 in which the step of sealing includes applying a non-porous coating along said path.

7. The method of claim 6 in which said non-porous coating is platinum.

8. The method of claim 1 in which said dopant is antimony.

9. The method of claim 8 in which said compound is antimony chloride.

10. The method of claim 9 in which said reactant is chlorine.

11. The method of claim 5 in which the step of at least partially sintering includes irradiating said path with a particle beam.

12. The method of claim 1 in which said particle beam is a photon beam.

13. The method of claim 1 in which said photon beam is a laser beam.

14. The method of claim 1 further including the step of consolidating the remaining porous portions of said waveguide layer.

* * * * *